United States Patent Office 3,598,659
Patented Aug. 10, 1971

3,598,659
METHOD FOR PRODUCING A CORROSION-RESISTANT COATING UPON METALS AND CORROSION-RESISTANT COATINGS SO-PRODUCED
Adolf Klingler, Carl Zeiss Strasse 35, Aalen, Germany, and Hans Heiz, Dulliken, Switzerland; said Hans Heiz assignor to said Adolf Klingler
No Drawing. Filed Nov. 12, 1968, Ser. No. 775,136
Claims priority, application Switzerland, Nov. 15, 1967, 15,967/68
Int. Cl. G23f 7/10
U.S. Cl. 148—6.15           12 Claims

ABSTRACT OF THE DISCLOSURE

Method for producing corrosion-resistant coating on metals, particularly iron, and coating so-produced. The coating comprises two layers, the first of which is a mixture of materials which pacifies the metal surface, and adheres tightly thereto while remaining flexible. The first layer includes phosphoric acid; $Fe_3O_4$ or $MnO_2$; powdered aluminum, zinc, copper or mixtures; oil modified alkyd resin; talcum, bentonite, gypsum or lime; and a mixture of solvents. The second layer provides good mechanical strength to the corrosion resistant coating.

---

The present invention relates to an improved method for producing a corrosion-resistant coating upon metals and additionally, pertains to metals, particularly iron, provided with a corrosion-resistant coating according to the aforesaid method.

In order to protect metals, especially iron, against corrosion, the surface to be protected is generally covered with suitable coating materials. This is normally accomplished by application or a corrosion-resistant coating to the metal surface. Another possibility for obtaining an effective protection against corrosion resides in altering the material which is to be protected by the inclusion of additives, especially alloying metals, in such a way that there is achieved an increased resistance to corrosion effects, for instance, as in rust-proof steel. The last-mentioned technique, however, possesses the drawback that it is relatively expensive and, moreover, is not usable for all fields of application.

In order to achieve a complete protection against corrosion by applying a protective covering or coating, the following conditions must be fulfilled:

The coating should provide a non-porous film. This is achieved with known techniques by using at least five coatings, for instance, three prime or undercoats and two finishing coats.

The system should possess a relatively low water permeability.

The bonding agent should possess hydrophilic properties in order to be able to again give off absorbed moisture.

The system should use active pigments having the property of rendering the surface passive for as long a time as possible in order to be able to immediately destroy the penetrating atmospheric influences or weathering factors.

With the conventional protective coverings or coatings the total thickness of the layer should amount to at least 150 μm. Additionally, the coating must be applied to a faultlessly cleaned, especially completely rust-free, metal surface.

These methods in which a number, generally at least five, layers have to be applied are cumbersome and time-consuming and therefore expensive.

According to another prior art coating technique suitable for rendering iron corrosion-resistant, a passively acting undercoat is applied to an iron surface covered with a layer of rust and after drying, this undercoat is covered with a dense or compact finishing coat. In this method, known as "phosphating," the surface containing the rust is treated with soluble phosphates, whereby there occurs a reaction of the rust with the phosphates while forming a fixedly-adhering crystalline phosphate layer which is only soluble in acids or solutions of alkali. This layer is then covered with a coating of lacquer or varnish for which it simultaneously serves as an adhesion layer.

However, this method has the drawback that it is only suitable for iron surfaces which are covered with a rust layer, in other words, not for only partially oxidized or clean surfaces. Additionally, this method does not provide perfect corrosion-resistant protection for surfaces where the rust layer does not consist of pure iron (III) hydroxide, but rather contains other compounds as such appear under the influence of industrial waste gases.

A further known method in which there is employed a combination of phosphoric acid and finely distributed metallic lead is based generally upon the same principles and possesses the same disadvantages as phosphating.

Accordingly, it is a primary object of the present invention to provide an improved method which enables the application of a corrosion-resistant protective coating to metals, which coating can be applied to oxidized as well as partially oxidized or clean surfaces, and with which only two layers or coats are required in order to achieve a complete protection against corrosion.

Additionally, it is an important object of this inventiontion to provide a corrosion-resistant protective coating which is strong and durable while remaining flexible or resilient.

Yet another object of this invention is the provision of a coating technique which is relatively simple and inexpensive while providing optimum properties in the protected metal.

A further object of this invention is the provision of corrosion-resistant metal coatings which are significantly thinner than those required with prior art techniques.

Other objects will in part be obvious and in part be pointed out as the description of the invention proceeds.

Now, in order to implement the foregoing and still further objects of the invention, a method is utilized wherein a first layer is applied to the cleaned yet, as the case may be, still completely or partially oxidized metal surface. This first layer consists of a mixture which contains:

(a) Active components which bring about a pacification of the metal surface;
(b) a film-forming component which provides an elastic film;
(c) a hydrophilic bonding agent which swells in water; and
(d) a mixture of organic solvents of different volatility.

Components (a) and (b) set forth above are selected such that between themselves they form insoluble compounds which fixedly adhere to the support surface.

The aforementioned mixture is permitted to solidify and then a second layer comprising a film-forming mixture is applied, the composition of this second layer being different from that of the first layer and the second layer being constituted such that it only causes a superficial swelling of the surface of the first layer situated therebelow and after solidification forms a fixedly-adhering, gas permeable layer.

Thus, to carry out the inventive method there are employed two mixtures which are to be applied in succession, wherein the first mixture contains:

(a) active components which bring about a pacification of the metallic surface;

(b) a film-forming component which provides an elastic film;
(c) a hydrophilic bonding agent which swells in water; and
(d) a mixture of organic solvents of different volatility, wherein, the components (a) and (b) are matched or accommodated to one another in such a way that they are capable of forming between themselves insoluble compounds.

The second mixture preferably consists essentially of an epoxy resin which is dissolved or suspended in a methyl ethyl ketone/xylene mixture.

The first mixture advantageously contains as component (a), a mixture of phosphoric acid, an oxide of a metal existing in a number of valences, for instance, $Fe_3O_4$ or $MnO_2$, and at least one powdery metal, for instance, aluminum, zinc or copper, or mixtures thereof; as component (b), an oil modified alkyd resin, for instance, an oil modified phthalic resin containing 32% phthalic anhydride, 44% linseed oil/tung oil, and 10% modifying resins; as component (c), talcum, and as component (d), a mixture of methyl ethyl ketone and/or acetone and xylene.

For producing the second layer there is preferred a film-forming mixture which consists essentially of an epoxide dissolved or suspended in a methoyl ethyl ketone-xylene mixture. Thus, for instance, a mixture having the following composition has proved to be particularly useful for producing the second layer.

|  | Percent by weight |
|---|---|
| Epoxy resin | 57.5 |
| Methyl ethyl ketone | 27.5 |
| Xylene | 15.0 |

If desired, it would be possible to add to the mixture serving to form the second layer dyes, pigments, and/or glazing agents.

The protective coatings obtained by practicing the teachings of the invention manifest themselves through their exceptional adherability and resistance to corrosion. This is also the case if the undercoat or priming coating is applied to a surface which contains rust. What is remarkable is that layer thicknesses of 50 to 60 μm. are sufficient in order to insure complete corrosion protection. Characteristic of these coatings is the fact that there does not occur any complete hardening, rather a certain elasticity remains and even after a longer period of time, no embrittlement occurs.

With a protective coating consisting of two layers and produced according to the inventive method, the following results, for instance, were realized:

| | |
|---|---|
| Layer thickness | 50 to 60 μm. |
| Bending strength (determined by mandrel test) | No formation of cracks or or fissures and no peeling with mandrel radii >10 mm. (T=20° C.). |
| Porosity density (determined by immersion in copper sulfate solution) | Surface free of pores. |
| Stability of resistance: | |
| (a) in 15% sodium chloride solution T=20° C., duration 10 days | Adhesion good; individual small bubbles. |
| (b) in 10% hydrochloric acid T=20° C., duration 10 days | No changes. |
| (c) in mineral oil T=20° C., duration 10 days | No changes. |

The inventive method is especially suited for the production of corrosion-resistant coatings upon iron and is employed with particular advantage in the automotive industry. By means of such inventive method it is possible to achieve a complete and permanent corrosion protection with low cost and expenditure of time.

The invention will be further explained with reference to the following illustrative example.

EXAMPLE

Rusted iron sheet metal is cleaned, degreased and freed of its rolling skin or scale, without however, the rust being completely removed After drying, the first layer serving as the undercoat is applied. For this purpose there is used a mixture consisting of:

(a) 16.0% by weight phosphoric acid; 3.0% $Fe_3O_4$ and 3.0% powdery aluminum;
(b) 51.0% by weight oil modified alkyd resin;
(c) 10.0% by weight talcum; and
(d) 17.0% by weight methyl ethyl ketone.

In order to produce the mixture initially components (b) and (d) are mixed, that is to say, the resin is dissolved or suspended in the solvent. To approximately ⅔ of the resin solution there is then added, while intensely stirring, the phosphoric acid, the $Fe_3O_4$, the aluminum powder and lastly, the talcum. The mixture, while foaming, heats up to a temperature of 50° C. to 60° C. Generally, it is sufficient to carry out an intense stirring in order to prevent further temperature increases. If desired, it is possible to also externally cool. Finally, the remainder of the resin solution is added while intensely stirring. Stirring is continued until the mass has calmed and it is permitted to cool. Prior to application of the coating it must be thinned with xylene.

Application of the primer or undercoat can be undertaken by coating or spraying. The amount of coating which is applied is adjusted such that the thickness of the layer after drying amounts to 50 to 60 μm. Drying is undertaken for preferably approximately ten days. The layer hardens without becoming embrittled and forms a good adhering and very resistant coating. The resistance of the coating can be attributed, among other things, to the formation of so-called metal or metallic soaps which in the present case form during the reaction of the aluminum with the oils contained in the oil modified alkyd resins. Additionally, the phosphoric acid causes a pacification of the metallic surface. The coating, even after hardening, possesses a certain softness and elasticity, upon which can be predicated its exceptionally high bending strength.

In order to obtain a good mechanical strength the finishing coat is then applied to the undercoat. For this purpose there is advantageously employed a mixture composed of 57.5% by weight epoxy resin; 27.5% by weight methyl ethyl ketone and 15% by weight xylene, wherein initially the solvents are mixed and then the resin is suspended in the mixed solvent. After hardening of the finishing coat, which has an exceptionally good adherence to the undercoat, the protective coating possesses the previously mentioned excellent characteristics or properties. The good adherence to the undercoat can be attributed to the fact that the solvent used for the finishing coat causes a superficial or surface swelling up of the undercoat, resulting in a particularly solid connection.

Instead of using methyl ethyl ketone it would be possible to use other ketones, such as acetone or isobutyl ketone, as well as instead of xylene other, relatively difficult to volatilize, solvents, for instance, white spirits. What is of importance is that the solvent mixture contains an easy to volatilize, and a difficult to volatilize, component. Additionally, the solvents which are to be used for producing the second layer are to be accommodated to the composition of the mixture used for producing the first layer such that the first layer is not attacked, rather only caused to undergo a superficial or surface swelling.

Additionally, there can be added to the second mixture glazing agents, for instance "Sangajol" dyes, pigments or drying agents.

Instead of the aluminum powder used in the previous example, it would also be possible to use zinc or copper powder as well as mixture of these metals in appropriate quantities.

The talcum used as the bonding agent can be replaced by bentonite, gypsum, or lime, and instead of the alkyd resin it would be possible to use other appropriate oil modified resins. In so doing, the only prerequisite is that the resin indeed hardens, yet remains elastic and exhibits a certain softness.

It should be apparent from the foregoing detailed description, that the objects set forth at the outset to the specification have been successfully achieved.

Accordingly, what is claimed is:

1. A method for producing a corrosion-resistant coating upon iron or iron alloys, especially rusted iron, comprising the steps of applying a first layer to the cleaned but, as the case may be, still completely or partially oxidized metallic surface, said first layer consisting essentially of:
   (a) a mixture of phosphoric acid, an oxide of a metal existing in a number of valences selected from the group consisting of $Fe_3O_4$ and $MnO_2$, and at least one powdery metal as the active pigment selected from the group consisting of aluminum, zinc and copper, and mixtures of the same;
   (b) an oil modified alkyd resin;
   (c) a hydrophilic bonding agent swellable in water selected from the group consisting of talcum, bentonite, gypsum, and lime; and
   (d) a mixture of organic solvents selected from the group comprising methyl ethyl ketone, acetone, isobutyl ketone, xylene and white spirits;
wherein components (a) and (b) are selected such that together they form insoluble compounds which fixedly adhere to the metallic surface;
   thereafter allowing the mixture to solidify; and
   subsequent thereto applying a second layer comprising a film-forming mixture containing the same solvent as the mixture of the first layer, the composition of said second layer being different from that of the first layer and causing only a superficial swelling of the first layer situated therebelow and after solidification forms a fixedly-adhering gas permeable, finishing layer.

2. The method defined in claim 1, wherein the oil modified alkyd resin is a phthalic resin containing 32% phthalic anhydride, 44% linseed oil/tung oil and 10% modifying resins.

3. The method defined in claim 1 including the step of controlling the quantity of the mixture used to form the first layer so that the layer thickness, after hardening, amounts to between about 50 and 60 $\mu$m.

4. The method defined in claim 1 wherein said second layer comprising said film-forming mixture consists essentially of an epoxide which is dissolved or suspended in a methyl ethyl ketone/xylene mixture.

5. The method defined in claim 4, wherein the second layer includes glazing agents.

6. The method defined in claim 4, wherein the second layer includes dyes or pigments.

7. A corrosion-resistant coating for iron or iron alloys, comprising two layers formed of two mixtures which are applied in succession, wherein the first layer contacting the surface of the metal consists essentially of:
   (a) a mixture of phosphoric acid, an oxide of a metal existing in a number of valences selected from the group consisting of $Fe_3O_4$ and $MnO_2$, and at least one powdery metal serving as the active pigment selected from the group consisting of aluminum, zinc and copper, and mixtures of the same;
   (b) an oil-modified alkyd resin;
   (c) a hydrophilic bonding agent swellable in water selected from the group consisting of talcum, bentonite, gypsum, and lime; and
   (d) a mixture of a solvent selected from the group comprising methyl ethyl ketone, acetone, isobutyl ketone, xylene, and white spirits;
and the second layer applied as a cover layer consists essentially of a mixture of a resin component different from that of the first layer, and the same solvent mixture as the first layer.

8. The coating defined in claim 7, wherein the mixture of the second layer consists essentially of an epoxy resin dissolved or suspended in a methyl ethyl ketone/xylene mixture.

9. The coating defined in claim 7, wherein the first mixture consists of a coatable mass which is modified with xylene and composed of
   (a) 16.0% by weight phosphoric acid; 3.0% $Fe_3O_4$; and 3.0% powdery aluminum;
   (b) 51.0% by weight oil modified alkyd resin;
   (c) 10.0% by weight talcum; and
   (d) 17.0% by weight methyl ethyl ketone.

10. The coating defined in claim 7 wherein the second mixture consists of 57.5% by weight epoxy resin, 27.5% by weight methyl ethyl ketone, and 15% xylene.

11. The coating defined in claim 7 wherein the second mixture includes dyes or pigments.

12. The coating defined in claim 7, wherein the second mixture includes glazing agents.

References Cited

UNITED STATES PATENTS

| | | | |
|---|---|---|---|
| 2,636,257 | 4/1953 | Ford | 148—6.15X |
| 2,692,840 | 10/1954 | Bell | 148—6.16 |
| 3,067,044 | 12/1962 | Johnston et al. | 148—6.15X |

RALPH S. KENDALL, Primary Examiner

U.S. Cl. X.R.

117—75, 132; 148—31.5